US009512725B2

(12) United States Patent
Light et al.

(10) Patent No.: US 9,512,725 B2
(45) Date of Patent: Dec. 6, 2016

(54) METHOD AND APPARATUS FOR TURBINE ENGINE THRU BOLT STUD AND NUT RETENTION

(71) Applicant: Siemens Energy, Inc., Orlando, FL (US)

(72) Inventors: Kevin M. Light, Maitland, FL (US); Ryan Murphy, Gastonia, NC (US); Harshawardhan S. Bhide, Oviedo, FL (US); Eric Joseph Oberson, Oviedo, FL (US); John E. Wilber, East Hampton, CT (US); Jason T. Silverman, Newington, CT (US); Rimal K. Patel, Manchester, CT (US); David M. M. Griffiths, West Hartford, CT (US)

(73) Assignee: Siemens Energy, Inc., Orlando, FL (US)

( * ) Notice: Subject to any disclaimer, the term of this patent is extended or adjusted under 35 U.S.C. 154(b) by 1 day.

(21) Appl. No.: 14/255,987

(22) Filed: Apr. 18, 2014

(65) Prior Publication Data

US 2015/0330222 A1 Nov. 19, 2015

(51) Int. Cl.
| F04D 29/54 | (2006.01) |
| F01D 5/02 | (2006.01) |
| F16B 39/22 | (2006.01) |
| F01D 5/06 | (2006.01) |
| F01D 21/04 | (2006.01) |

(52) U.S. Cl.
CPC ............... *F01D 5/02* (2013.01); *F01D 5/066* (2013.01); *F16B 39/22* (2013.01); *F01D 21/045* (2013.01); *F05D 2260/31* (2013.01); *Y10T 29/49323* (2015.01)

(58) Field of Classification Search
CPC .... B25B 23/0085; B25B 27/16; F16B 39/101; F16B 39/22; F01D 21/045; F01D 5/02; F01D 5/066; F05D 2260/31; Y10T 29/49323
See application file for complete search history.

(56) References Cited

U.S. PATENT DOCUMENTS

| 4,534,101 A * | 8/1985 | Rosan, Jr. ............... F16B 39/10 29/258 |
| 5,071,300 A * | 12/1991 | McCauley .............. F16B 37/14 411/222 |
| 7,367,766 B2 * | 5/2008 | Dao ........................ F04D 19/02 411/119 |
| 8,038,377 B2 | 10/2011 | Ichiryu | |
| 8,100,666 B2 * | 1/2012 | Makuszewski ......... F01D 5/066 29/889.1 |
| 8,172,496 B2 * | 5/2012 | Vile ........................ F16B 39/16 411/190 |

(Continued)

*Primary Examiner* — Jesse Bogue (57) ABSTRACT

Broken remnants of turbine engine rotor thru-bolt/nut interfaces are enveloped in a housing that is coupled to the rotor, so that the remnant does not migrate to other portions of the engine. In exemplary embodiments the housing directly mates with and engages the thru-bolt stud male threaded portion that projects outwardly from the nut, such as by a female threaded sleeve that is engaged with the male threads. The sleeve is in turn coupled to and/or supported by the rest of the housing. Some housing embodiments surround one or more of the threaded stud/nut interfaces. Housing embodiments of the invention are installed in situ without removing the rotor structure from the engine.

17 Claims, 6 Drawing Sheets

(56) References Cited

U.S. PATENT DOCUMENTS

| | | | |
|---|---|---|---|
| 8,807,896 B2* | 8/2014 | McKinlay | F16B 39/24 411/147 |
| 8,899,895 B2* | 12/2014 | McKinlay | F16B 39/24 411/147 |
| 9,016,997 B2* | 4/2015 | Dooner | B60B 3/165 411/13 |
| 2006/0188357 A1* | 8/2006 | Rowe | F16B 37/044 411/119 |
| 2013/0202450 A1* | 8/2013 | Ivakitch | F16D 1/076 416/248 |
| 2013/0207447 A1* | 8/2013 | De Lima | B60B 3/145 301/9.1 |

* cited by examiner

METHOD AND APPARATUS FOR TURBINE ENGINE THRU BOLT STUD AND NUT RETENTION

BACKGROUND OF THE INVENTION

1. Field of the Invention

The invention relates to retention of turbine engine thru-bolt stud/nut interface retention. Apparatus and methods of the invention retain thru-bolt stud/nut remnants within the confines of the affected rotor disc, in an unforeseeable event that a thru-bolt fractures, so that they do not migrate into the engine's gas flow path. More particularly, a housing coupled to the rotor envelops the projecting thru-bolt stud, so that the stud/nut remnant is captured by the housing.

2. Description of the Prior Art

Figure 1:
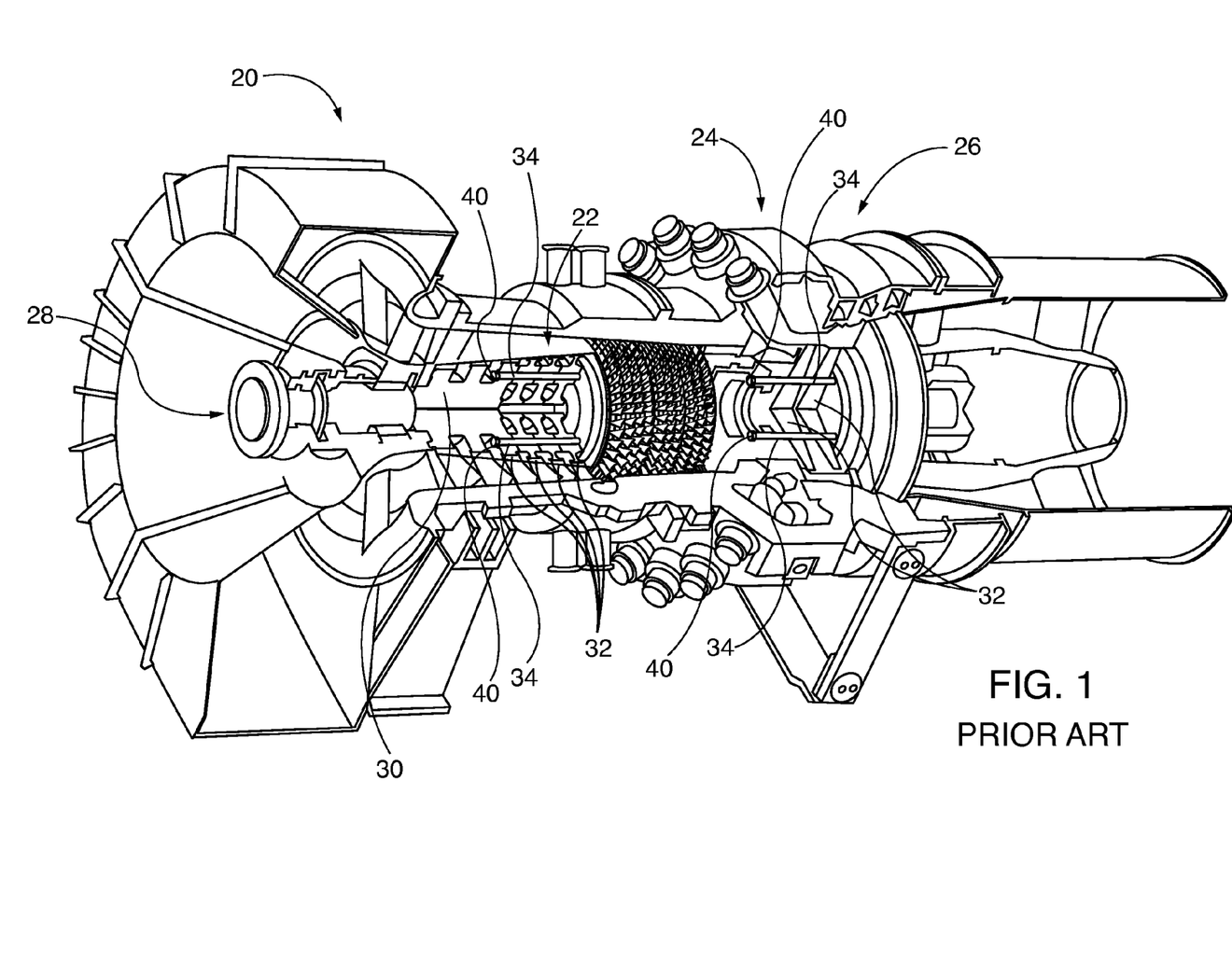
FIGS. 1 and 2 are perspective views of an exemplary known combustion turbine engine, with mating thru-bolts/nut interfaces within rotor disc cavities in the compressor and turbine sections, shown in partial cross section.
Figure 2:
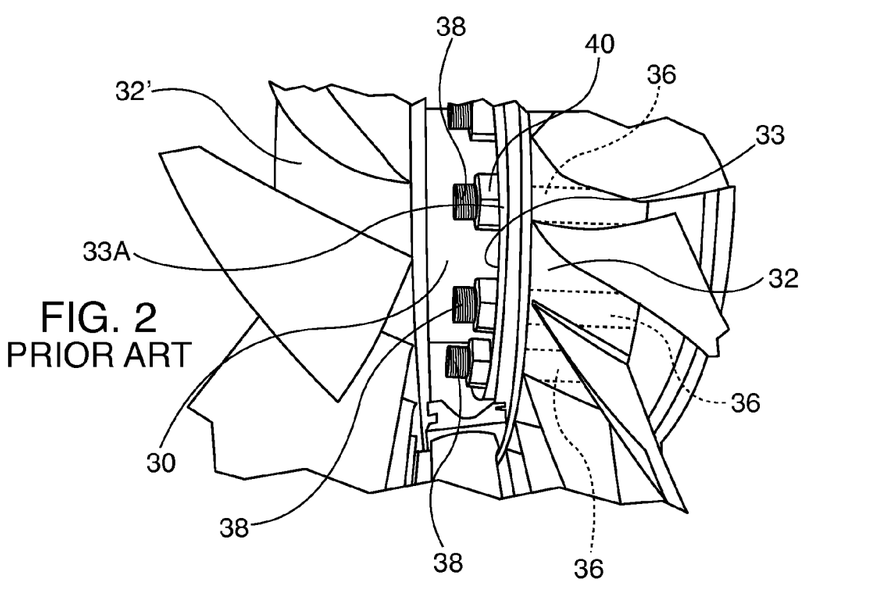

Known gas and steam turbine engines have rotors comprising a plurality of serially aligned rotor discs with a circumferentially spaced array of axially aligned rotor disc bolt hole cavities. The rotor discs are axially retained by thru-bolts that are inserted in the axially aligned disc bolt hole cavities from one axial end of the rotor. The known exemplary combustion turbine engine 20, shown schematically FIGS. 1 and 2, has a compressor section 22, a combustor section 24 and a turbine section 26. Rotor 28 has a rotor shaft 30. The exemplary compressor section of the rotor 28 has an axially aligned stack of rotor discs 32 that are retained by compressive thru-bolts 34 with male threaded stud ends 36 and mating nuts 40 on both ends of the bolt. After torqueing the thru-bolts to a desired elongation for establishing compressive force on the rotor disc 32 stack, a thru-bolt stud tip 38 projects outwardly from the stud 36/nut 40 interface. In the event that a thru-bolt breaks, it shears off perpendicularly across the threaded portion 36 approximately along a line defining nut 40 contact with the rotor disc axial face 33. After the breakage, the rotor 28 stiffness changes, causing the engine 20 operational monitoring system to alarm the condition and trip (stop) service operation. However, notwithstanding the service operation trip, the broken stud 36/nut40 interface remnant is susceptible to migration through the turbine engine 20 flow path, risking domestic object damage to the engine internal components.

SUMMARY OF THE INVENTION

Accordingly, a suggested object of some exemplary embodiments of the invention is to prevent broken rotor disc thru-bolt stud/nut interface remnants from migrating within a turbine engine, in order to reduce or mitigate likelihood of domestic object damage to the engine's internal components.

Another object of some exemplary embodiments of the invention is to capture broken rotor disc-thru-bolt stud/nut interface remnants in a housing that is coupled to the rotor without modifying the thru-bolt or the nut components.

An additional object of some exemplary embodiments of the invention is to capture broken rotor disc thru-bolt stud/nut interface remnants in a housing that is coupled to the rotor without removing the rotor from the engine, such as by removing the engine casing top cover and installing the housing over the rotor shaft in the unoccupied volumetric space between opposing rotor discs.

These and other objects are achieved in one or more embodiments of the invention by an apparatus comprising a housing, coupled to the rotor, that envelops the projecting threaded stud and nut interface remnant. In exemplary embodiments the housing directly mates with and engages the thru-bolt stud male threaded portion that projects outwardly from the nut, such as by a female threaded sleeve that is engaged with the male threads. The sleeve is in turn coupled to and/or supported by the rest of the housing. In the event of a bolt/nut interface breakage the remnant remains enveloped by the housing (e.g., retained by the female threaded sleeve and threaded stud projecting tip), so that the remnant does not migrate within the turbine engine.

Exemplary embodiments are directed to a method for retaining a turbine engine rotor thru-bolt projecting threaded stud and nut interface, by enveloping the projecting thru-bolt stud in a housing that is coupled to the rotor.

Other exemplary embodiments are directed to apparatus for retaining a turbine engine rotor thru-bolt projecting threaded stud and nut interface, comprising a housing adapted for enveloping the thru-bolt projecting threaded stud and adapted for coupling directly to an axial face of a rotor disc.

Additional embodiments are directed to a turbine engine, including apparatus for retaining rotor thru-bolt projecting threaded stud and nut interfaces. The turbine engine includes a rotor having a shaft and first and second rotor discs that are coupled to the shaft by a plurality of thru-bolts and respective corresponding interfacing nuts that are in contact with the an axial face of first rotor disc, with a thru-bolt threaded stud distal tip projecting from each respective nut. In this embodiment the housing envelops at least one thru-bolt projecting threaded stud, which is adapted for coupling directly to an axial face of one of the rotor discs.

The respective objects and features of the present invention may be applied jointly or severally in any combination or sub-combination.

BRIEF DESCRIPTION OF THE DRAWINGS

The teachings of the present invention exemplary embodiments can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of exemplary embodiments of the present invention can be readily utilized to retain broken remnants of turbine engine rotor thru-bolt/nut interfaces, so that the remnant does not migrate to other portions of the engine. The remnant projecting thread stud is enveloped in a housing. In exemplary embodiments, the housing directly mates with and engages the thru-bolt stud male threaded portion that projects outwardly from the nut, such as by a female threaded sleeve that is engaged with the male threads. The sleeve is in turn coupled to and/or supported by the rest of the housing. Some housing embodiments surround one or more of the threaded stud/nut interfaces. Housing embodiments of the invention are installed in situ without removing the rotor structure from the engine. Thus in the event of a bolt/nut interface breakage the remnant remains enveloped by the housing (e.g., retained by the female threaded sleeve and threaded stud projecting tip), so that the remnant does not migrate within the turbine engine.

Figure 3:
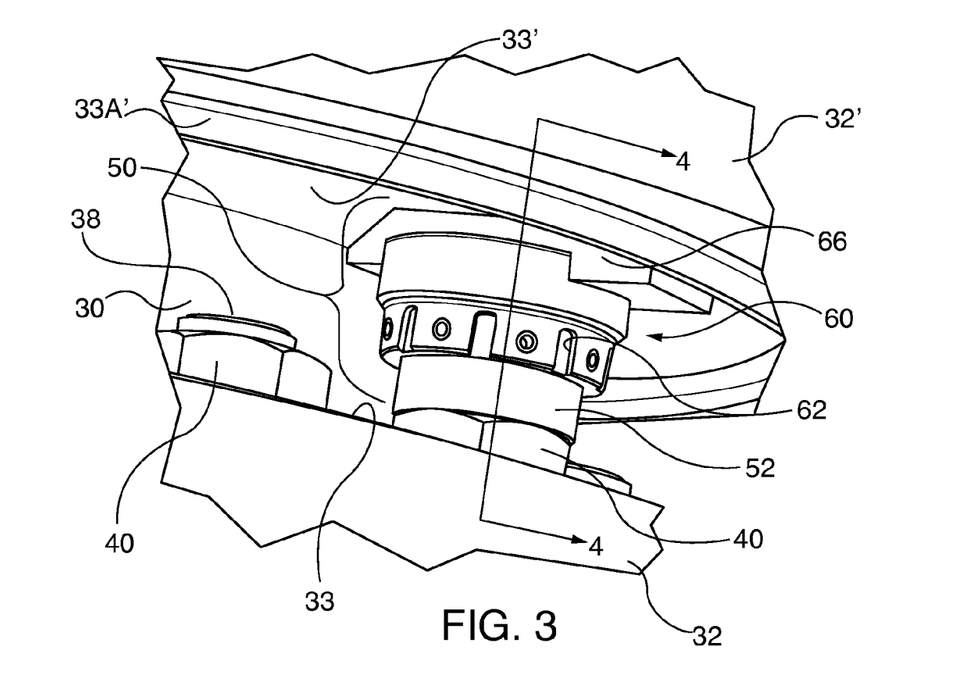
FIG. 3 is a circumferential perspective view of an exemplary turnbuckle housing embodiment of the of the invention.
Figure 4:
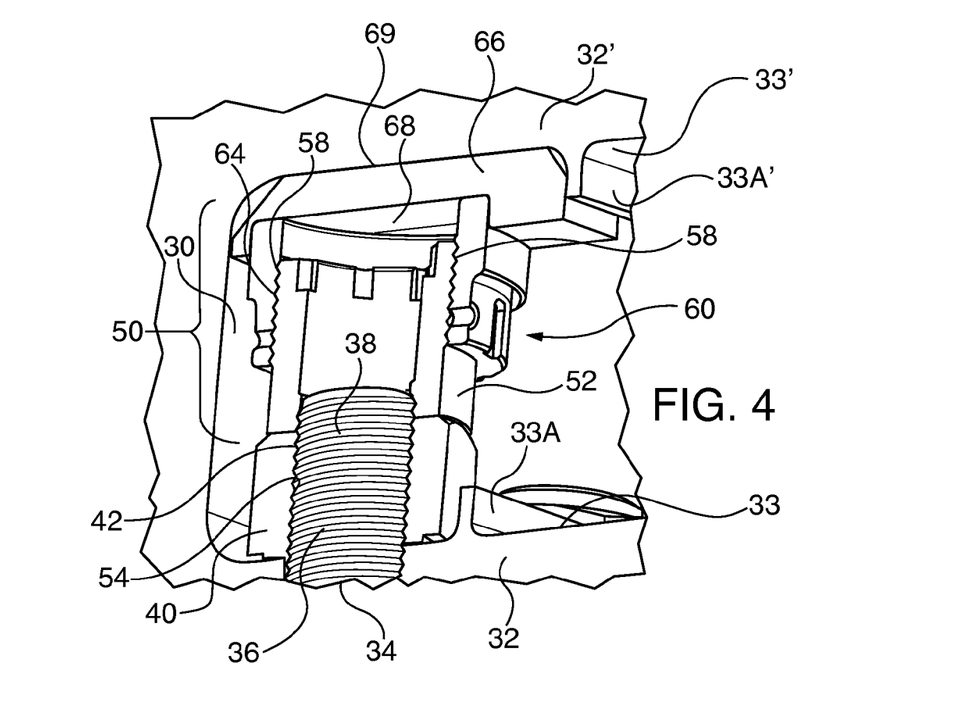
FIG. 4 is an axial cross sectional view of the housing embodiment of FIG. 3.
Figure 5:
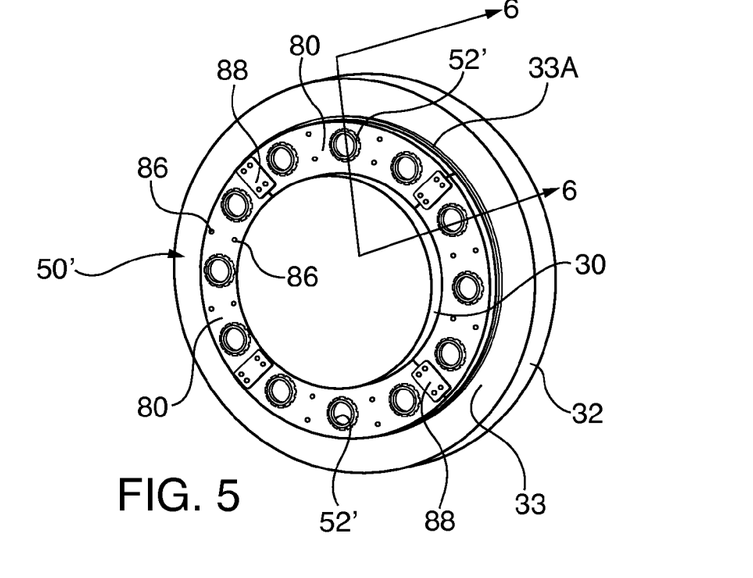
FIG. 5 is a schematic perspective view of an exemplary "boxed" annular housing embodiment of the invention.
Figure 6:
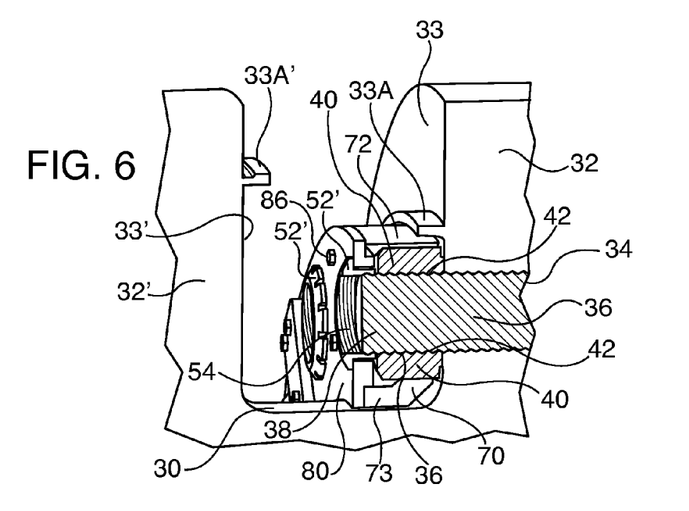
FIG. 6 is an axial cross sectional view of the housing embodiment of FIG. 5.
Figures 7, 8, 9:
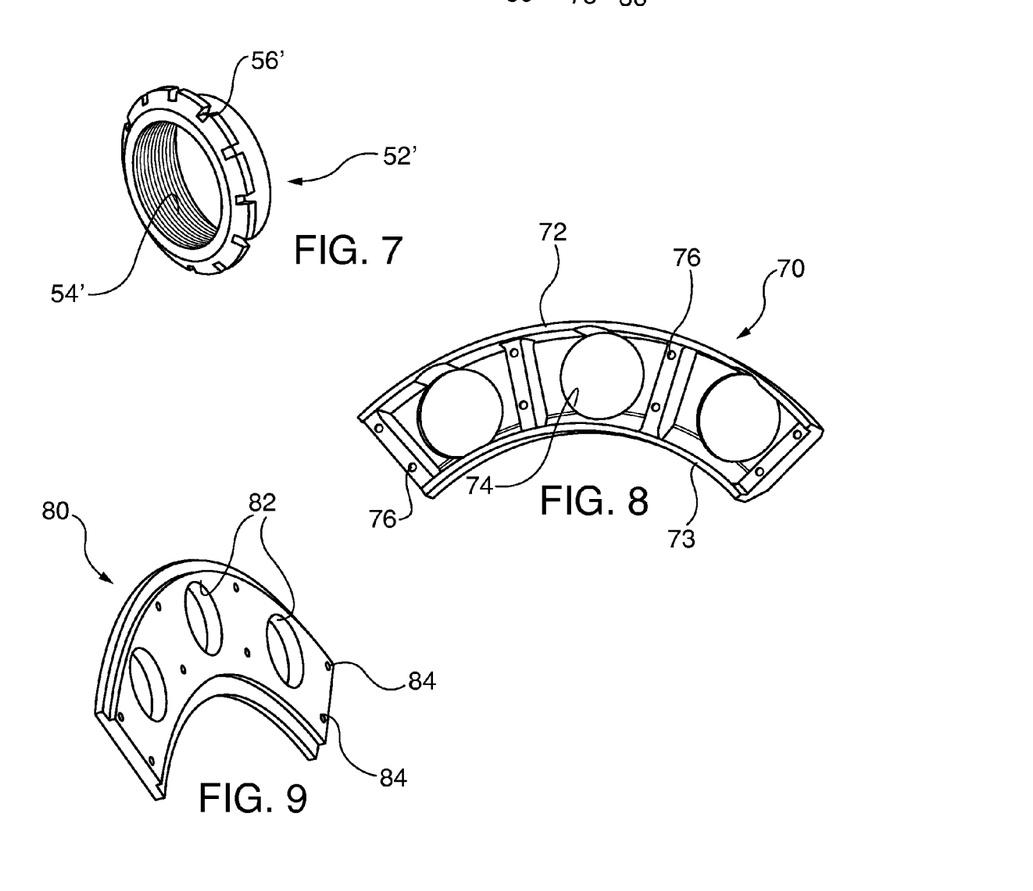
FIG. 7 is a perspective alternative embodiment of threaded sleeve that engages and envelops a male threaded projecting tip of a thru-bolt.
FIG. 8 is a detailed perspective view of a housing outer flange of the housing embodiment of FIG. 5.
FIG. 9 is a detailed perspective view of a housing inner flange of the housing embodiment of FIG. 5.

FIGS. 3 and 4 show a turnbuckle housing embodiment 50, in which a sleeve 52 with female inner circumferential threads 54 mates with male threads 36 of the thru-bolt projecting tip 38. Spanner engagement slots 62 facilitate tightening of the sleeve 52 relative to the thru-bolt projecting tip 38. The sleeve 52 has distal end threads 58 for threaded engagement with turnbuckle threads 64 of turnbuckle 60. The turnbuckle 60 abuts a proximal face 68 of the turnbuckle backing plate 66. The backing plate 66 has a distal face 69 that in turn abuts against an axial face 33' of an opposing spaced rotor disc 32'. Preferably as shown, the backing plate 66 radially oriented ends abut and conform to the rotor shaft 30 outer profile and the inner circumferential profile of the rotor disc circumferential flange 33A', which helps the turnbuckle backing plate resist rotation as the turnbuckle 60 is tensioned by way of turnbuckle spanner engagement slots 62. Additionally and optionally the turnbuckle distal face 69 is textured for positive abutting engagement with the turnbuckle 60 during tensioning. The tensioned turnbuckle 60 axial biasing pressure against the thru-bolt projecting tip 38 and nut 40 restrains a potential broken stud tip/nut remnant migration, as the remnant does not have sufficient clearance to rock or tip out of alignment with the turnbuckle housing 50.

In the embodiments of FIGS. 6-16 one or a plurality of bolt stud 36/nut 40 remnants are enveloped in "boxed" housings 50', 50", 50''' and 50'''' that are oriented in the volumetric space between opposing rotor disc axial faces 33 and 33'. Those exemplary housings are generally annular shaped and constructed in sectors that facilitate in situ installation on a rotor 38 that is installed in a turbine engine, by removal of the engine casing top cover during periodic service. While FIGS. 6-16 show annular shaped housings that envelop an entire array of rotor thru-bolts, other housing shapes may be substituted and any smaller number of thru-bolt/nut interfaces may be retained within any housing structure-from one interface to any plurality of interfaces.

In the embodiment of FIGS. 5-9, the housing 50' comprises four sector shaped outer flanges 70 that form outer 72 and inner 73 circumferential skirts that radially constrain stud 36/nut 40 remnants radially there between. The outer flanges define apertures 74 for receipt of the thru-bolts 34 and mating nuts 40. Sector shaped inner flanges 80 abut against distal tips of the flange outer and inner skirts 72, 73. The inner flanges define bores 84 for passage of housing fasteners 86 that engage threaded bores 76 formed within the outer flanges 70. The fasteners 86 axially unitize the coupled, assembled inner 70 and outer 80 flanges, which in turn envelop the stud 36/nut 40 interfaces. The inner flange sectors 80 optionally are further joined by scab plates 88 that bridge radially abutting faces of those sectors. The inner flanges 80 define inner flange apertures 82 for passage of the sleeves 52', with the sleeves in turn in mating threaded engagement with a corresponding thru-bolt stud projecting threaded tip 38 by way of sleeve inner female threads 54'. Spanner engagement slots 56' facilitate tightening of each sleeve 52' and its corresponding distal tip 38. Once a sleeve 52' is engaged with a thru-bolt distal projecting tip 38 the housing 50' outer flange 70 is in abutting, tensioned contact with its corresponding rotor disc axial face 33, which restrains radial and axial movement of the corresponding housing structure.

Figure 10:
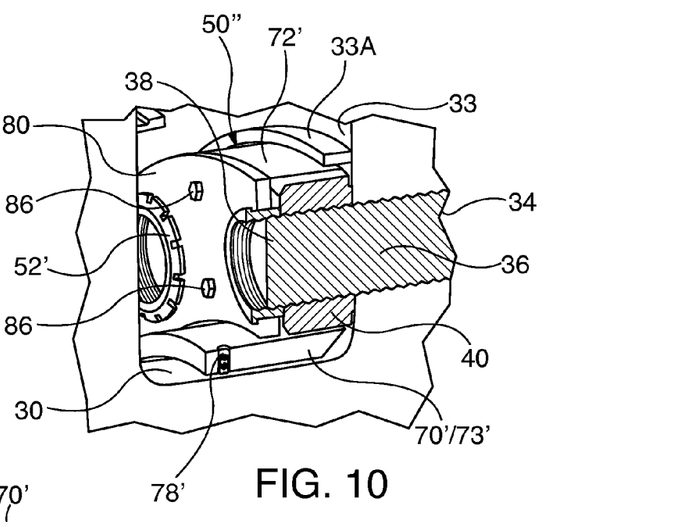
FIGS. 10 and 11 are axial cross sectional views of an alternative "boxed" annular housing embodiment of the invention that radially biases the housing against the adjoining rotor disc.
Figure 11:
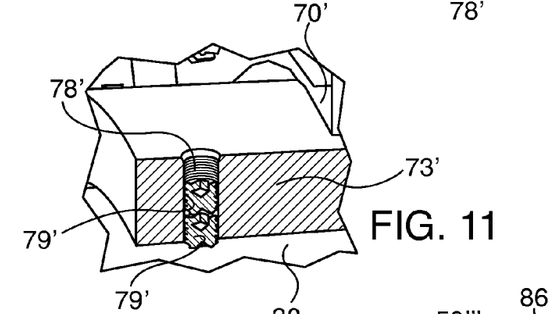
Figure 12:
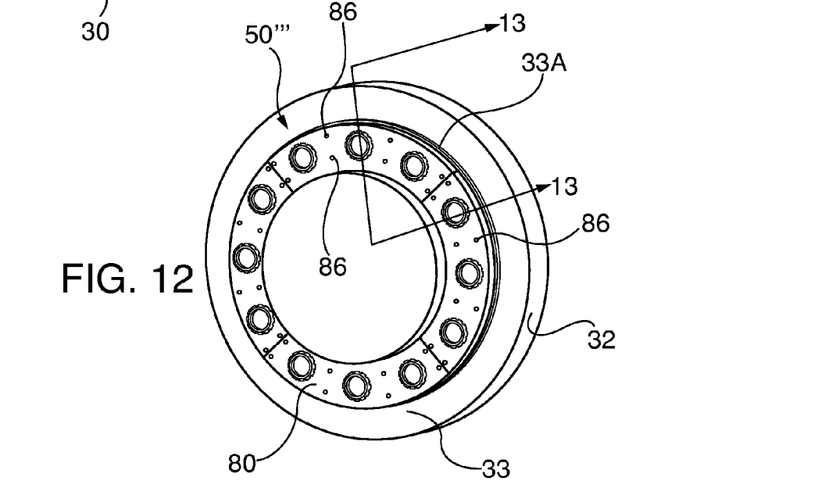
FIG. 12 is a schematic perspective view of an additional exemplary "boxed" annular housing embodiment of the invention that is screwed directly to an axial face of the adjoining rotor disc.
Figures 13, 14, 15, 16:
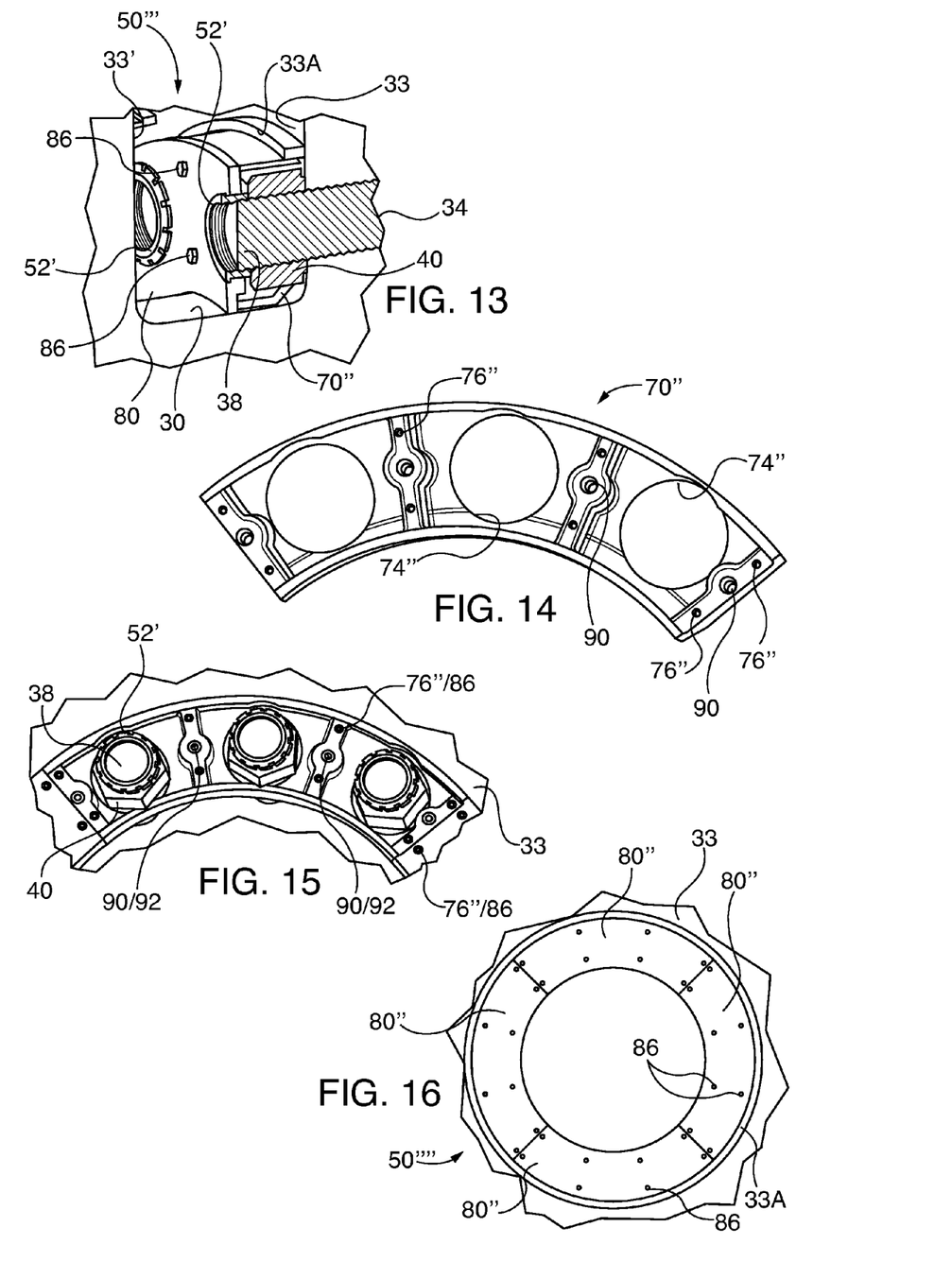
FIG. 13 is an axial cross sectional view of the housing embodiment of FIG. 12.
FIG. 14 is a detailed perspective view of a housing inner flange of the housing embodiment of FIG. 12.
FIG. 15 is detailed perspective view of a portion of a sector portion of the assembled housing embodiment of FIG. 12 that is screwed to an axial face of the adjoining rotor disc, with the inner flange removed.
FIG. 16 is a schematic perspective view of an additional exemplary "boxed" annular housing embodiment of the invention.

The housing embodiment 50" of FIGS. 10 and 11 are similar to the housing embodiment 50', but add radial biasing of the housing relative to rotor shaft 30 and rotor disc circumferential flange 33A. In the housing 50" embodiment, the outer flange 70' incorporates outer skirt 72' that abuts radially against the rotor disc circumferential flange 33A, while the inner skirt 73' defines inner skirt radially threaded bores 78' for receipt of one or more Allen screws 79'. Tightening the Allen screws 79' against the rotor shaft 30 outer circumferences in turn biases the outer skirt 72' against the rotor disc circumferential flange 33A.

The housing embodiment 50''' of FIGS. 12-15 is directly bolted to the rotor disc 32 by threaded apertures formed in the rotor disc circumferential face 33. In this embodiment the outer flange 70" defines aperture standoffs with thru bores 90, for passage of rotor disc fasteners 92 that engage with the corresponding female threaded bores 93 in the rotor disc circumferential face 33. The inner flange 80 is fastened to the outer flange 70" by fasteners 86 and the sleeves 52' engage the thru-bolt projecting tips 38, as previously described with respect to the housing embodiments 50' and 50".Alternatively, in the housing embodiment 50'''' of FIG. 16, there are no sleeves 52' to engage the bolt tips 38. Potential stud/nut remnants are constrained within the internal closed volume of the housing 50''''.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for retaining a turbine engine rotor thru-bolt projecting threaded stud and nut interface, comprising:
enveloping the projecting thru-bolt stud in a housing that is coupled to the rotor;
coupling a turnbuckle to the thru-bolt stud and the housing; and
biasing the thru-bolt stud and the housing against the rotor with the turnbuckle.

2. The method of claim 1, the housing comprising a mating threaded sleeve that is coupled to a distal tip of the projecting threaded stud.

3. The method of claim 2, further comprising coupling the housing to a rotor disc.

4. The method of claim 3, further comprising coupling the housing to a rotor disc that is compressed by the threaded stud and nut interface.

5. The method of claim 3, further comprising enveloping a plurality of thru-bolt projecting threaded stud and nut interfaces with the housing.

6. The method of claim 5, further comprising coupling the housing to each of the projecting threaded stud and nut interfaces with corresponding threaded sleeves.

7. The method of claim 6, further comprising:
providing a rotor disc with an axially projecting rotor disc circumferential flange;
providing a generally annular shaped housing enveloping a plurality of thru-bolt projecting threaded stud and nut interfaces in the housing, which is oriented between the rotor and the rotor disc circumferential flange; and
radially biasing the housing between a shaft of the rotor and the rotor disc circumferential flange.

8. The method of claim 3, further comprising coupling the housing directly to a rotor disc with an outer flange that is fastened to threaded holes defined by the rotor disc.

9. The method of claim 1, further comprising supporting and restraining motion of the projecting threaded stud distal tip by coupling it to the housing with a mating threaded sleeve that is in turn coupled to the housing and the turnbuckle.

10. Apparatus for retaining a turbine engine rotor thru-bolt projecting threaded stud and nut interface, the threaded stud having a projecting distal tip, the rotor having a first rotor disc axial face that is in contact with the threaded stud and nut interface, and a second rotor disc axial face that is in opposed spaced orientation relative to the first rotor disc axial face and the thru-bolt projecting distal tip, comprising:
a housing, for enveloping the thru-bolt projecting threaded stud and for coupling directly to an axial face of a rotor disc;
a threaded sleeve for coupling to the housing, and for mating threaded engagement coupling to the distal tip of the thru-bolt projecting threaded stud;
a turnbuckle backing plate, for abutting contact with the second rotor disc axial face; and
a turnbuckle for interposition between the turnbuckle backing plate and the threaded sleeve, for selectively applying axial biasing force against the thru-bolt projecting distal tip.

11. The apparatus of claim 10, the housing having a generally annular shape, for circumferential envelopment of the rotor shaft and a plurality of thru-bolt projecting threaded stud and nut interfaces.

12. The apparatus of claim 11, further comprising the housing having an outer flange backing plate including radially oriented threaded elements, for radially biasing the housing between the rotor shaft and a circumferential flange of the first rotor disc.

13. The apparatus of claim 11, further comprising a plurality of threaded sleeves coupled to the housing and respectively, for threaded engagement coupling to a distal tip of a corresponding respective projecting threaded stud, for retaining the housing in biased contact with the rotor disc.

14. The apparatus of claim 11, the housing having a an outer flange backing plate, for coupling with threaded fasteners, directly to threaded holes formed in an axial face of a first rotor disc that is in contact with the threaded stud and nut interface.

15. The apparatus of claim 10, the housing and turnbuckle supporting and restraining motion of the projecting threaded stud distal tip.

16. A turbine engine, including apparatus for retaining rotor thru-bolt projecting threaded stud and nut interfaces, comprising:
a turbine engine including a rotor having a shaft and first and second rotor discs that are coupled to the shaft by a plurality of thru-bolts and respective corresponding interfacing nuts that are in contact with the an axial face of first rotor disc, with a thru-bolt threaded stud distal tip projecting from each respective nut;
a housing enveloping at least one thru-bolt projecting threaded stud,
a turnbuckle backing plate, for abutting contact with an axial face of the second rotor disc that is in opposed spaced orientation relative to the first rotor disc axial face and the at least one thru-bolt projecting distal tip; and
a turnbuckle interposed between the turnbuckle backing plate and the housing, for selectively applying axial biasing force against the projecting distal tip of the at least one thru-bolt threaded stud.

17. The turbine engine of claim 16, the housing further comprising:
a generally annular shaped housing circumferentially enveloping the rotor shaft, having an outer flange backing plate abutting the first rotor disc axial face;
an inner flange backing plate coupled to the outer flange backing plate, defining a compartment there between that envelopes rotor shaft and the plurality of threaded stud and nut interfaces; and
a plurality of threaded sleeves coupled to the inner flange backing plate, each engaging a distal tip of a corresponding respective projecting threaded stud, for retaining the housing in biased contact with the first rotor disc axial face.

* * * * *